(12) United States Patent
Prouvost et al.

(10) Patent No.: US 11,377,277 B2
(45) Date of Patent: Jul. 5, 2022

(54) REMOVABLE CLOSURE AND COATING SYSTEM

(71) Applicant: Valspar Sourcing, Inc., Minneapolis, MN (US)

(72) Inventors: Benoit Prouvost, L'Abergement (FR); Philippe Michel, Le Temple de Bretagne (FR); Delphine Destal, Bouaye (FR)

(73) Assignee: SWIMC LLC, Cleveland, OH (US)

( * ) Notice: Subject to any disclaimer, the term of this patent is extended or adjusted under 35 U.S.C. 154(b) by 122 days.

(21) Appl. No.: 15/026,876

(22) PCT Filed: Sep. 24, 2014

(86) PCT No.: PCT/US2014/057135
§ 371 (c)(1),
(2) Date: Apr. 1, 2016

(87) PCT Pub. No.: WO2015/050756
PCT Pub. Date: Apr. 9, 2015

(65) Prior Publication Data
US 2016/0221733 A1 Aug. 4, 2016

Related U.S. Application Data

(60) Provisional application No. 61/976,845, filed on Apr. 8, 2014, provisional application No. 61/885,632, filed on Oct. 2, 2013.

(51) Int. Cl.
*B65D 53/02* (2006.01)
*C09D 167/00* (2006.01)
(Continued)

(52) U.S. Cl.
CPC ............. *B65D 53/02* (2013.01); *B65D 41/00* (2013.01); *B65D 41/023* (2013.01); *C09D 5/08* (2013.01); *C09D 167/00* (2013.01)

(58) Field of Classification Search
CPC .......... C07C 33/00; C07C 47/00; C07C 39/06; C07C 39/02; C07C 39/00; C07C 69/92;
(Continued)

(56) References Cited

U.S. PATENT DOCUMENTS 2,877,922 A * 3/1959 De Cristoforo .......... B05D 7/16
220/62.12
4,021,396 A 5/1977 Wu
(Continued)

FOREIGN PATENT DOCUMENTS

CN 101517020 A 8/2009
CN 102264791 A 11/2011
(Continued)

OTHER PUBLICATIONS

NPL_cresol (Biedermann, Maurus, and Koni Grob. "Phenolic Resins for Can Coatings: II. Resoles Based on Cresol/Phenol Mixtures or Tert. Butyl Phenol." LWT—Food Science and Technology, vol. 39, No. 6, 2006, pp. 647-659., doi:10.1016/j.lwt.2005.04.007).*
(Continued)

*Primary Examiner* — Michael C Miggins
(74) *Attorney, Agent, or Firm* — Kagan Binder, PLLC

(57) ABSTRACT

The present invention is based upon a coating system that uses polycyclic polyester polymers and phenolic resins. The coating system comprises first and second coatings. The first coating preferably is derived from ingredients comprising a polycyclic polyester resin having first and second fused rings that share at least two atoms in common. The second coating preferably is derived from ingredients comprising a polycyclic polyester resin that may be different than the polyester of the first coating.

23 Claims, 1 Drawing Sheet

(51) Int. Cl.
*B65D 41/00* (2006.01)
*B65D 41/02* (2006.01)
*C09D 5/08* (2006.01)

(58) Field of Classification Search
CPC ....... C07C 69/00; C07C 69/76; C07C 403/10; C07C 403/00; C07C 403/02; C07C 403/06; B32B 7/00; B32B 9/00; B32B 27/00; B32B 2250/02; C08L 61/12; C08L 61/14; C08L 67/00; C08L 67/02; C08L 2203/10; C08L 2205/03; C08L 2666/22; C08L 71/00; C09D 167/02; C09D 167/00; C09D 5/08; C09D 167/06; C09D 175/06; C09D 161/06; C09D 161/14; C09D 5/03; B65D 41/00; B65D 41/023; B65D 53/02; C08G 8/28; C08G 2/34; C08G 8/36; C08G 65/42; C08G 65/38
USPC ......... 220/378, 524.3, 524.2; 428/35.7, 35.9, 428/35.8, 458, 480, 36.91, 418, 209, 339, 428/341, 34.3, 416, 34.1; 215/12.2
See application file for complete search history.

(56) References Cited

U.S. PATENT DOCUMENTS

| | | | |
|---|---|---|---|
| 4,124,554 A | 11/1978 | Fry | |
| 4,207,222 A | 6/1980 | Blum et al. | |
| 4,247,439 A | 1/1981 | Matthews et al. | |
| 4,393,119 A | 7/1983 | Cocannon | |
| 4,442,246 A | 4/1984 | Brown et al. | |
| 4,446,258 A | 5/1984 | Chu et al. | |
| 4,476,262 A | 10/1984 | Chu et al. | |
| 4,480,058 A | 10/1984 | Ting et al. | |
| 5,296,525 A | 3/1994 | Spencer | |
| 5,381,914 A * | 1/1995 | Koyama | B29C 70/80 215/341 |
| 5,491,031 A * | 2/1996 | Seibel | C09D 161/06 428/458 |
| 5,830,952 A | 11/1998 | Pedersen et al. | |
| 6,084,036 A | 7/2000 | Carney et al. | |
| 6,087,417 A | 7/2000 | Stevenson et al. | |
| 6,143,841 A | 11/2000 | Spittka et al. | |
| 6,217,960 B1 | 4/2001 | Groen in't Woud et al. | |
| 6,300,428 B1 | 10/2001 | Stevenson et al. | |
| 6,476,119 B1 | 11/2002 | Kucera et al. | |
| 6,586,505 B1 | 7/2003 | Cronin et al. | |
| 7,189,787 B2 | 3/2007 | O'Brien et al. | |
| 8,092,876 B2 | 1/2012 | O'Brien et al. | |
| 9,862,584 B2 | 1/2018 | Clusserath | |
| 2004/0044117 A1 | 3/2004 | Kiefer-Liptak et al. | |
| 2004/0132895 A1 | 7/2004 | Ambrose et al. | |
| 2006/0199911 A1* | 9/2006 | Markovich | C08L 23/0815 525/192 |
| 2006/0229415 A1* | 10/2006 | Boyer | C08J 3/03 525/390 |
| 2009/0047524 A1* | 2/2009 | Yaoi | B32B 7/12 428/418 |
| 2010/0068433 A1 | 3/2010 | Glbanel et al. | |
| 2010/0178442 A1 | 7/2010 | O'Brien et al. | |
| 2010/0260954 A1* | 10/2010 | Stenson | C08G 18/423 428/35.8 |
| 2010/0323116 A1* | 12/2010 | Urbano | C09D 167/00 427/427.4 |
| 2011/0220645 A1 | 9/2011 | Niederst et al. | |
| 2011/0288232 A1 | 11/2011 | Rademacher et al. | |
| 2011/0290696 A1 | 12/2011 | Stenson et al. | |
| 2012/0118785 A1 | 5/2012 | Kainz et al. | |
| 2012/0125799 A1 | 5/2012 | Doreau et al. | |
| 2012/0145721 A1 | 6/2012 | Cavallin et al. | |
| 2012/0276315 A1 | 11/2012 | Michel et al. | |
| 2012/0302690 A1 | 11/2012 | Cunningham et al. | |
| 2013/0206756 A1 | 8/2013 | Niederst et al. | |
| 2013/0280454 A1 | 10/2013 | Telford et al. | |
| 2013/0316109 A1 | 11/2013 | Niederst et al. | |
| 2015/0376435 A1 | 12/2015 | Youlton et al. | |
| 2016/0244212 A1 | 8/2016 | Destal et al. | |

FOREIGN PATENT DOCUMENTS

| | | |
|---|---|---|
| GB | 1459843 | 12/1976 |
| WO | 99/37722 A1 | 7/1999 |
| WO | 2008/036629 A2 | 3/2008 |
| WO | 2008/137562 A1 | 11/2008 |
| WO | 2010062928 A1 | 6/2010 |
| WO | 2010/097353 A2 | 9/2010 |
| WO | 2011/130671 A2 | 10/2011 |
| WO | 2011149449 A1 | 12/2011 |
| WO | 2012/089747 A1 | 7/2012 |
| WO | 2013/079718 A1 | 6/2013 |
| WO | 2013/079719 A1 | 6/2013 |
| WO | 2013/098218 A1 | 7/2013 |

OTHER PUBLICATIONS

Wicks, Zeno et al., Organic Coatings: Science and Technology, vol. 1, pp. 122-132 (John Wiley &Sons: New York, 1992).

Wicks, Zeno et al., Organic Coatings: Science and Technology, vol. 1, pp. 184-186 (John Wiley & Sons: New York, 1992).

Plenco, "Phenolic Novolacand Resol Resins" http://www.plenco.com/phenolic-novolac-resol-resins.htm, [retrieved on Jul. 26, 2017], pp. 1-7.

* cited by examiner

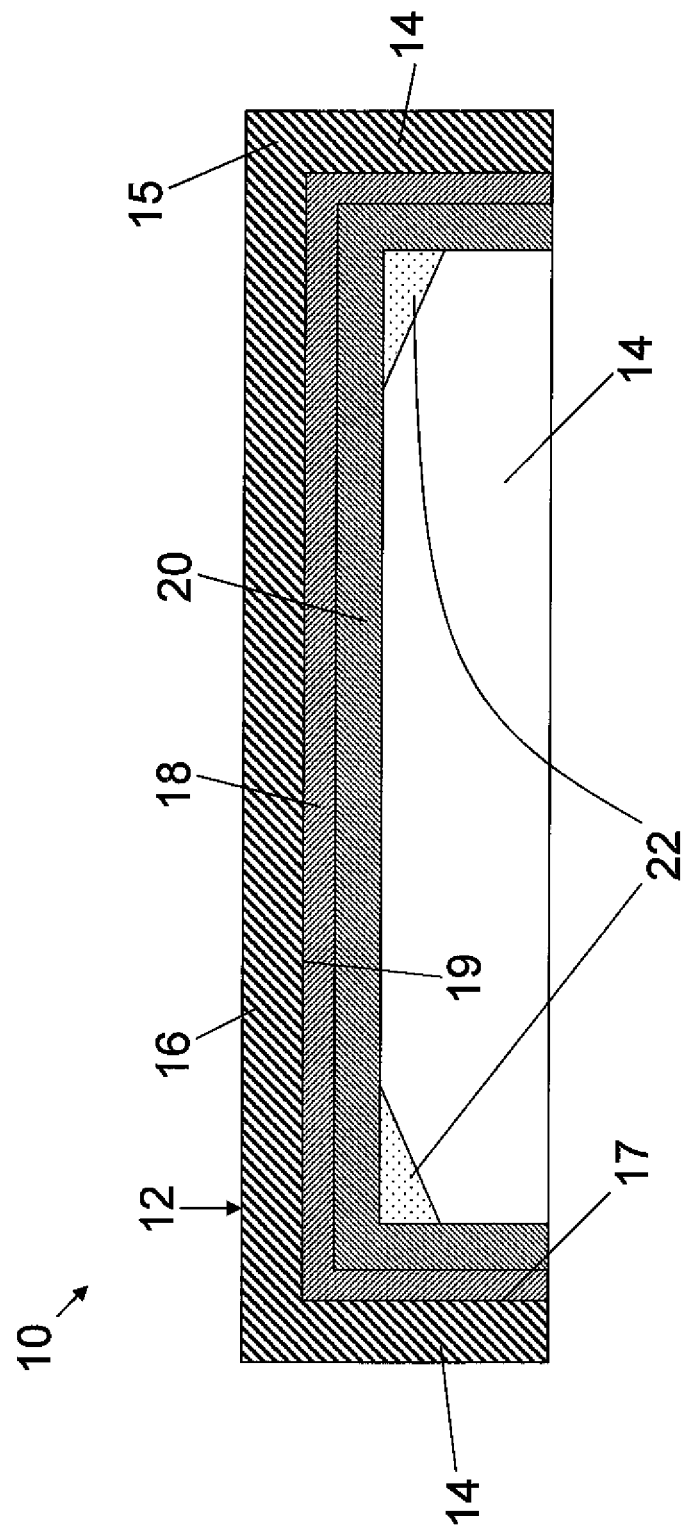

REMOVABLE CLOSURE AND COATING SYSTEM

PRIORITY CLAIM

The present patent Application claims priority to International No. PCT/US2014/057135, file Sep. 24, 2014, which in turn claims priority under 35 USC § 119(e) from U.S. Provisional Patent Application having Ser. No. 61/885,632, filed on Oct. 2, 2013, titled REMOVABLE CLOSURE AND COATING SYSTEM, and U.S. Provisional Patent Application having Ser. No. 61/976,845, filed on Apr. 8, 2014, titled REMOVABLE CLOSURE AND COATING SYSTEM, wherein the entirety of said patent applications are incorporated herein by reference for all purposes.

TECHNICAL FIELD

The present invention relates to removable closures for packaging containers, coating compositions useful in such closures, and processes for making such coating compositions.

BACKGROUND OF THE INVENTION

The application of coatings to metals to inhibit corrosion is well established. This is particularly true in the area of packaging containers such as metal food, beverage containers and twist off caps. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food, beverage containers and closures such as twist off caps to prevent corrosion in the headspace of the container between the fill line of the food product and the container lid.

Packaging coatings should preferably be capable of high-speed application to the substrate and provide the necessary properties when hardened to perform in this demanding end use. For example, the coating should be safe for food contact, not adversely affect the taste of the packaged food or beverage product, have excellent adhesion to the substrate, resist staining and other coating defects such as "blushing" and/or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Conventional closures for packaging containers incorporate one or more coatings that are typically derived from physical and/or chemically curable formulations that include one or more thermoplastic and/or thermosetting resins. (e.g., vinyl chloride polymers such as, for example, poly(vinyl chloride) ("PVC")), or epoxy-derived resins).

When these coatings are applied to a substrate and cured, the coatings and/or the coated substrate can degrade and/or discolor. For example, the degradation products from PVC-based coatings, such as hydrochloric acid ("HCl"), can attack the substrate. Additionally, these degradation products may cause yellowing of white closures. To stabilize thermoplastic materials such as PVC and reduce degradation, epoxy resins and/or other stabilizers typically are added to the coating formulations. It has been a common practice to use epoxy novolacs and epoxidized linseed oil. These epoxy resins typically incorporate polyglycidyl ethers of aromatic polyols such as bisphenol A diglycidyl ether (often referred to as "BADGE").

Coatings derived from epoxy functional materials may include small amounts of (i) unreacted bisphenol A ("BPA") or the epoxidized ethers of aromatic polyols such as BADGE; and/or (ii) low-molecular-weight components containing BPA or BADGE. In the food packaging industry, these materials potentially can migrate into packaged foodstuffs over time. In addition, conventional coating systems for use in packaging applications that require exposure to aggressive or corrosive food or beverage products often use a BPA- or BADGE-containing epoxy-phenolic size coat in combination with a topcoat formulation containing thermoplastic materials such as PVC.

Although the balance of scientific evidence available to date does not indicate clearly that traces of the aforementioned compounds pose health risks to humans, these compounds are perceived by some as being potentially harmful to human health. Consequently, there is a desire to reduce or eliminate these compounds from food-contact coatings. However, it has been problematic to formulate coating formulations without these materials, or with these materials that exhibit very low or non-detectable levels of mobile forms of these compounds, while still retaining desired coating characteristics (e.g., flexibility, adhesion, corrosion resistance, stability, abrasion resistance, etc.).

As a result, there is a continuing need for improved coating compositions for use on removable closures, especially in the food packaging industry.

SUMMARY OF THE INVENTION

The present invention is based upon a coating system that preferably uses polycyclic polyester polymers and phenolic resins. The coating system comprises first and second coatings. The first coating is derived from ingredients comprising a polyester resin, which preferably is a polycyclic polyester resin having first and second fused rings that share two atoms in common. The second coating is derived from ingredients comprising a polyester resin, which preferably is a polycyclic polyester resin that may be different than the polyester of the first coating.

In preferred embodiments, the resultant coatings are substantially free of polyvinyl chloride. Other preferred embodiments of the invention are additionally substantially free of mobile bisphenol A (BPA) and BADGE, more preferably substantially free of BPA and BADGE whether mobile or not. Other preferred embodiments of the invention are substantially free of mobile aromatic glycidyl ether compounds, more preferably substantially free of aromatic glycidyl ether compounds whether mobile or not. Some embodiments are substantially free of PVC-based resins as well as mobile forms of BPA, BADGE and other aromatic glycidyl ether compounds. Some embodiments are substantially free of PVC-based resins as well as BPA, BADGE and other aromatic glycidyl ether compounds whether mobile or not.

In one aspect, the invention comprises a removable closure for a packaging article. The closure comprises:
  (a) a substrate having an interior and an exterior surface;
  (b) a first, at least partially cured coating applied onto at least a portion of the interior surface of the substrate, said first coating derived from ingredients comprising:

(i) at least one first polycyclic polyester, wherein the polycyclic polyester comprises first and second fused rings that share at least two atoms in common; and
(ii) at least one first crosslinkable phenolic resin; and
(c) a second at least partially cured coating applied directly or indirectly onto at least a portion of the first coating, said second coating derived from ingredients comprising:
(i) at least one second polycyclic polyester; and
(ii) at least one second crosslinkable phenolic resin; and
(d) optionally a sealing composition, such as a gasket, applied directly or indirectly onto at least a portion of the second coating in a manner effective to help the closure sealingly engage a container (e.g., a glass foodstuffs or beverage container).

In another aspect, the invention provides a method of making a removable closure for packaging article. The method comprises the steps of:
(a) providing a first coating composition, said first coating composition being derived from ingredients comprising:
(i) at least one first polycyclic polyester resin wherein the polycyclic polyester comprises first and second fused rings that share at least two atoms in common; and
(ii) at least one first crosslinkable phenolic resin; and
(b) providing a second coating composition, said second coating composition being derived from ingredients comprising:
(i) at least one second polycyclic polyester; and
(ii) at least one second crosslinkable phenolic resin; and
(c) providing a substrate; and
(d) using the first and second coating compositions to form first and second coatings, respectively, on at least a portion of a surface of the substrate; and
(e) optionally, at least partially curing the first and second coating compositions.

In another aspect, the invention comprises a coating system. The system comprises:
(a) a first coating composition, said first coating composition comprising:
(i) at least one first polycyclic polyester resin wherein the polycyclic polyester comprises first and second fused rings that share at least two atoms in common; and
(ii) at least one first crosslinkable phenolic resin; and
(b) a second coating composition comprising:
(i) at least one second polycyclic polyester; and
(ii) at least one, second crosslinkable phenolic resin.

The coating compositions of the invention are especially useful for use on the interior surface of closures that are meant to seal the opening of a variety of containers. In many embodiments, the closures are removable from and, optionally, replaceable onto the container. Examples of such removable closures include twist-off closures for food packages, including cans, bottles, etc., and single use containers such as the pull off closures on beverage containers, etc.

The coating compositions of the invention protect the substrate against staining (e.g., yellowing), corrosion, moisture damage, acid damage, alkaline damage, and/or other chemical or physical damage such as damage caused by the contents of the container. They also impart coating hardness. Many embodiments are approved for food and beverage contact, making corresponding coatings useful for protecting food and beverage containers.

Additionally, the coating compositions of the invention exhibit excellent substrate, inter-layer, and gasket adhesion. The coating compositions also demonstrate a balance of flexibility and hardness that allows them to be applied to a substrate sheet (e.g., a metal sheet). After coating, the coated sheet may then be formed into a desired shape, such as a twist-off closure, without undue loss (if any) of adhesion to sheet or a loss of inter-layer adhesion.

Unless otherwise specified, the following terms as used herein have the meanings provided below.

The term "substantially free" with respect to a particular compound (or mobile forms of that compound if the term is used to refer to such mobile forms) means that a cured coating of the present invention contains less than 100 parts per million (ppm) of that compound (or mobile forms thereof if specified). As used herein, "ppm" or "ppb" (see below) are on a weight basis unless otherwise noted.

The term "essentially free" with a respect to a particular compound (or mobile forms of that compound if the term is used to refer to such mobile forms) means that a cured coating of the present invention contains less than 10 parts per million (ppm) of that compound (or mobile forms thereof if specified).

The term "essentially completely free" of a particular compound means that a cured coating of the present invention contains less than 1 part per million (ppm) of that compound.

The term "completely free" of a particular compound means that a cured coating of the present invention contains less than 20 parts per billion (ppb) of that compound (or mobile forms thereof if specified).

If the aforementioned phrases are used without the term "mobile" (e.g., "substantially free of BPA compound") then a cured coating of the present invention contains less than the aforementioned amount of the compound in any form, e.g., the compound is mobile in the coating or bound to or otherwise incorporated into a constituent of the coating.

The term "mobile" means that the compound can be extracted from the cured coating when a coating (typically ~1 mg/cm$^2$ (6.5 mg/in$^2$) thick) is exposed to HPLC-grade acetonitrile for 24 hours at 25° C.

The term "food-contact surface" refers to a surface of an article (e.g., a food or beverage container) that is in contact with, or suitable for contact with, a food or beverage product.

The term "sealing composition" refers to a material applied to a topcoat of an interior surface of a closure (e.g., twist off lids or caps) for purposes of helping to seal the closure to a container.

Unless otherwise indicated, a reference to a "(meth)acrylate" compound (where "meth" is bracketed) is meant to include both acrylate and methacrylate compounds.

The term "organosol" refers to a dispersion of organic particles, e.g., particles comprising one or more thermoplastic resins optionally in combination with one or more other ingredients or reaction products thereof, in a liquid carrier that includes an organic solvent. In addition to solvent, the liquid carrier may incorporate one or more other optional ingredients, e.g., at least one plasticizer, surfactant, etc.

The term "plastisol" refers to a dispersion of organic particles in a liquid phase comprising at least one plasticizer.

The term "resin" means an oligomer and or polymer. Oligomers or polymers may include polymerizable functionality that allows the resin to be further polymerized, cross-linked, or otherwise reactive as desired.

The term "oligomer" means a compound incorporating from two to ten repeating units.

The term "polymer" means a compound incorporating 11 or more repeating units. Repeating units typically are derived from one or more monomers.

A monomer generally includes at least one polymerizable moiety and generally constitutes a single repeating block when incorporated into an oligomer or polymer. A monomer may be incorporated into oligomers or polymers via co-polymerization with itself or with one or more other kinds of monomers, oligomers, and/or polymers. Non-polymerizable terminal moieties, e.g., a monoalcohol or alkoxy group with no additional reactive functional group, are not considered repeating units for purposes of the present invention.

Monomers often have number average molecular weights in the range from about 50 to about 1000. Oligomers often have number average molecular weights in the range from about 100 to about 10,000, even from about 250 to about 5000. Polymers often have number average molecular weights in the range from about 1000 to 1,000,000 or even from about 2000 to about 250,000, or even from about 2000 to about 50,000, or even 3000 to 25,000.

The term "crosslinker" refers to a molecule capable of forming a covalent linkage between two or more resins or between two or more different regions of the same resin. A resin may be a crosslinker that is self-crosslinking.

The term "polymer" includes both homopolymers (repeating units are derived from the same monomer) and copolymers (i.e., polymers of two or more different monomers). Similarly, "oligomer" includes both homo-oligomers and co-oligomers.

The terms "comprises", "having", "including", "incorporating", and variations thereof do not have a limiting meaning where these terms appear in the description and claims but rather are intended to be open-ended.

The terms "preferred" and "preferably" refer to embodiments of the invention that may afford certain benefits, under certain circumstances. However, other embodiments may also be preferred or otherwise suitable, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" amine can be interpreted to mean that the coating composition includes "one or more" amines.

Also herein, the recitations of numerical ranges by endpoints include all numbers subsumed within that range (e.g., 1 to 5 includes 1, 1.5, 2, 2.75, 3, 3.80, 4, 5, etc. and at least 1 includes 1, 1.5, 2, 17, etc.).

BRIEF DESCRIPTION OF THE DRAWINGS

FIG. 1 schematically shows a side view in cross section of an illustrative closure of the present invention.

DETAILED DESCRIPTION OF PRESENTLY PREFERRED EMBODIMENTS

The details of one or more embodiments of the invention are set forth in the description below and the summary above. Other features, objects, and advantages of the invention will be apparent from the summary above and the description and the claims that follow. The following description of the present invention is not intended to describe every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The present invention provides a removable closure for a packaging article, a coating composition system comprising first and second coating compositions, and resultant coating systems comprising a plurality of coatings obtained at least in part from the first and second coating compositions, and associated methods of making such closures, and systems. The first coating composition is preferably applied directly (i.e., the coating composition directly contacts the substrate) or indirectly (i.e., there is one or more intervening layers between at least a portion of the coating composition and at least a portion of the substrate) to the desired substrate to form a first coating proximal to the substrate. This first coating also may be referred to as a base coating, size coating, or a primer coating in the industry.

The second coating composition preferably is applied directly or indirectly to the first coating to form a second coating distal from the substrate. The second coating may be referred to as a topcoat, top coat, or top coating even though one or more additional, but optional coatings and/or other materials, such as a sealing compound, may be further applied to at least a portion of the second coating. Although the coating system may optionally include additional layers, some preferred embodiments of the coating system consist essentially of the first coating and the second coating optionally used in combination with a sealing compound.

In certain embodiments, the optional sealing composition may be applied to at least a portion of the coating system in a manner effective to enhance the seal between the closure and a container. In some embodiments, the sealing composition is provided in the form of an annular gasket adhered directly or indirectly to the coating system or the container in a manner such that the gasket sealingly engages the container or closure (as the case may be), such as engaging a rim, when the closure is fit onto the container. Examples of such food or beverage products may include certain acid-based food or beverages, milk-based products, meat-based products, onions, sauerkraut, fish in sauce, marinades, mussels, fruits in sweet sauces, energy drinks, coffee drinks, soups, mustard, mayonnaise, ketchup, salad dressings, pickled vegetables, sauerkraut, etc.

The removable closure may also be used to protect interior surfaces of packaging for non-food products, e.g. hair spray, hair dye, paints and stains, joint compound, concrete mixes, glue, cleaning compositions, etching compositions, pharmaceuticals, nutriceuticals, fertilizers, and the like.

As previously discussed, conventional coating systems often use PVC and/or epoxy-containing resins in one or more layers. The epoxy-containing resins of such coating systems typically incorporate BPA, bisphenol F (BPF), BADGE, or other oxirane-containing compounds, which may be undesirable for the reasons previously discussed. Preferred coating systems of the present invention, however, exhibit good adhesion (substrate, interlayer, and gasket adhesion) and corrosion resistance without using these materials.

While not presently preferred, coating compositions of the present invention optionally may incorporate one or more of PVC, BPA, BPF, BADGE, aromatic glycidyl ethers, or other oxirane-containing compounds, especially if such compounds are of a non-mobile form in the case of the oxirane-containing compounds.

In preferred embodiments, at least one (and more preferably both) of the first and second coating compositions is formulated in a manner such that corresponding cured coatings are substantially free of, more preferably essentially free of, even more preferably essentially completely free of, and most preferably completely free of one or more of the following compounds: (A) PVC resin(s): (B) mobile BPA, mobile BPF, and mobile aromatic glycidyl ether compounds (e.g., BADGE and/or diglycidyl ethers of BPF (BFDGE) and epoxy novalacs); (C) products derived from any of the compounds in (B); (D) higher molecular weight resins including one or more of the compounds of (B) even if such are non-mobile; (E) mobile oxirane-containing compounds derived from ingredients including one or more of the compounds listed in (B).

Exemplary packaging on which the closure of the invention may be used include, but are not limited to, cans such as beverage cans, food cans; drums, kegs, pails, decorative tins, tubes, bottles, monoblocs, and the like. Exemplary closure devices include, but are not limited to, caps, lids such as thin aluminum foil based lids for yogurt and butter containers, or crown corks; closures for glass jars and bottles such as roll-on closures, vacuum closures, twist on/off lids, pilfer-proof closures, easy peel lids, and easy open end or conventional ends for cans. Cans on which the closures of the invention can be used include, for example, 2-piece cans or 3-piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like.

The coated closures of the invention may be formed via any suitable method. The coating compositions of the present invention may, for example, be applied to and cured on a substrate material, e.g. rigid metal or plastic sheet or a flexible film or metal foil. Next, the coated substrate may be formed into the final closure shape via the desired technique(s). Illustrative embodiments of the coating system are sufficiently flexible to allow shaping after the cured coatings are formed. The cured protective coating system exhibits not only good flexibility, but also excellent chemical resistance, stain resistance, blush resistance, and the like especially in the presence of foodstuffs containing acetic acid, citric acid and/or lactic acid, and without exhibiting undue loss of adhesion. In the alternative, a substrate may be formed into a closure, and then the closure may be coated with the coating composition system. The substrate or coated substrate (as the case may be) used in the closure may be formed via stamping, drawing, redrawing, wall ironing, bending, beading, embossing, debossing, flanging, necking, stretching, blow-stretching, and any other suitable conventional method.

In one aspect, the present invention provides a rigid metal closure (e.g., a twist-off metal lid which may include fastening features such as lugs or threads) for use in sealing a food or beverage packaging container. Such packaging or containers include, e.g., a glass or plastic jar configured to receive the threads, lugs, or other engagement structure of the closure. The metal closure preferably includes a coating system of the present invention applied on at least a portion of an interior (e.g., food-contact) surface of the metal closure. In one embodiment, a first layer composition forms a first coating adhered to the metal substrate and a second layer composition forms a second coating adhered to the first layer composition. Optionally, sealing compound (which may be either a conventional PVC-based sealing compound or a PVC-free sealing compound) may be applied directly to the second composition. In one embodiment, the closure is formed from metal sheet having the coating system cured on at least one side thereof.

The substrate can be formed from wide range of materials. Such materials include metallic materials, polymeric materials, combinations of these, and the like. In many modes of practice, the substrate includes one or more metallic materials such as metals, metal alloys, intermetallic compositions, metal containing composites, combinations of these, and the like. Metallic embodiments of the substrate may comprise one or more metals including, but not limited to, aluminum and aluminum alloys, tinplate, cold rolled low carbon mild steel ("ETP"), electrolytic chromium/chromium oxide coated cold rolled low carbon mild steel (ECCS), tin-free steel, black plate, corten steel, and any other steel.

The substrate may comprise one or more layers. Each layer may have a thickness in the range of from 0.01 µm (micrometer) to 2 mm (millimeter); for example, from 0.01 µm to 1.5 mm; or in the alternative, from 0.01 µm to 1 mm; or in the alternative, from 0.01 µm to 0.5 mm; or in the alternative, from 0.01 µm to 0.2 mm; or in the alternative, from 0.01 µm to 0.1 mm or in the alternative, from 0.01 µm to 100 µm; or in the alternative, from 0.01 µm to 50 µm; or in the alternative, from 1 µm to 50 µm; or in the alternative, from 1 µm to 15 µm.

In addition to the coating system, the substrate optionally may be pre-coated with one or more pre-coating compositions. Such pre-coating compositions optionally may include, but are not limited to, one or more resin binders, one or more resin crosslinkers, one or more solvents, one or more additives, and one or more pigments. Exemplary resin binders include, but are not limited to, epoxy, polyester, polyvinyl chloride containing organosols/vinyls, phenolic, alkyd, oleoresin, acrylic resin, and the like.

Exemplary crosslinkers used in a pre-coating (and optionally other coatings of the coating system) include, but are not limited to, phenol-formaldehyde resins; amino-formaldehyde resins including but not limited to urea-formaldehyde, melamine formaldehyde, benzoguanamine formaldehyde; anhydride resins, phenolic crosslinkers (e.g., phenoplasts), amino crosslinkers (e.g., aminoplasts), blocked isocyanate resins and epoxy groups containing resins, including but not limited to, epoxy resins, epoxy groups containing polyesters, acrylic resins, vinyl resins or the like. Preferred crosslinkers are at least substantially free, more preferably completely free, of bound BPA and aromatic glycidyl ethers.

Any suitable carrier liquid may be used to prepare the first and second layer compositions. Exemplary solvents include, but are not limited to, aliphatic hydrocarbons (e.g., mineral spirits, kerosene, high flashpoint VM&P naphtha, and the like); aromatic hydrocarbons (e.g., benzene, toluene, xylene, solvent naphtha 100, 150, 200 and the like); alcohols (e.g., ethanol, n-propanol, isopropanol, n-butanol, iso-butanol and the like); ketones (e.g., acetone, 2-butanone, cyclohexanone, methyl aryl ketones, ethyl aryl ketones, methyl isoamyl ketones, and the like); esters (e.g., ethyl acetate, butyl acetate and the like); glycols (e.g., butyl glycol); glycol ethers (e.g., ethylene glycol monomethyl ether, ethylene glycol monoethyl ether, ethylene glycol monobutyl ether, propylene glycol monomethyl ether, methoxypropanol and the like); glycol esters (e.g., butyl glycol acetate, methoxypropyl acetate and the like); and mixtures thereof.

Exemplary additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal surface.

The polyester resin components of the first and second coating compositions may be the same or different from one another. Additionally, the coating compositions each independently may use one or more different polyester resins. The polyester resin preferably is a thermoplastic or thermosetting resin that includes at least one ester linkage as part of the resin backbone. Further, unless otherwise indicated, the use of a term designating a resin class such as, for example, "phenolic" or "polyester," is intended to include resins that include linkages of that class optionally in combination with one or, more additional kinds of polymerized linkages. For example, a polyester resin includes not only polyester linkage(s) but also may also include one or more urethane, urea, ether, carbamate, imide, amid; siloxane, bonds resulting from free radical polymerization, and/or other kinds of linkages.

At least one polyester resin of the polyester resin component is a polyester oligomer or polymer incorporating at least one polycyclic group-containing repeating unit (hereinafter "polycyclic polyester resin"). A single polycyclic polyester resin or a mixture of two or more different polycyclic polyester resins may be used according to the present invention. One or more additional polyester resins without polycyclic character also may be included in the polyester resin component. In preferred embodiments, a polycyclic polyester resin is linear and/or hydroxylated.

The term "polycyclic" when used in this context means that the compound comprises a plurality of ring moieties. As one advantage, and without wishing to be bound by theory, it is believed that the polycyclic character of the polyester resin component helps to impart flexibility to the cured coating. Also, the polycyclic character of the polyester resin component is believed to helps to improve corrosion protection, adhesion to the substrate and the second coating, stain resistance, acid resistance, blush resistance, and resistance to yellowing relative to compositions using only polyester resins without polycyclic character. In particular, it is believed that the polycyclic character helps to make the coating systems of the present invention suitable for holding corrosive food products such as sauerkraut and the like. The polycyclic polyester character also is believed to help function as a plasticizer for the phenolic resin component. While not intending to be bound by theory, it is believed that the presence of the polycyclic groups is a key factor as to why preferred embodiments of the compositions provide coatings that have properties and performances that approach those of conventional coatings that incorporate PVC, BPA-based, BPF-based, BPFDGE-based, or BADGE-based epoxy resins. This is a significant performance result, as developing alternative formulations without resorting to PVC, BPA-based, BPF-based, BPFDGE-based, or BADGE-based epoxy resins has been very challenging and elusive.

Without wishing to be bound, it is also believed that the polycyclic character provides high Tg characteristics, inert reactivity with respect to other components of the coatings as well items stored in corresponding packages sealed with the closures, and plasticizing functionality. Such characteristics conventionally are associated with PVC resins, not so much with polyester resins. Sharing such properties with PVC resins, the polycyclic polyesters in the practice of the present invention mimic PVC resins and are able to be used as alternatives to form PVC-free coatings with excellent performance conventionally associated with PVC-based formulations.

More preferably, the term "polycyclic" refers to a compound that includes at least two cyclic groups in which one or more atoms (and more typically two or more atoms) are present in the rings of at least two cyclic groups. Thus, for example, fused rings sharing at least one atom are polycyclic according to this more preferred definition. Fused rings that share 1 atom are referred to as spiro rings. Other embodiments of fused rings share 2 or 3 or more atoms. A ring that shares 3 or more atoms with another ring is referred to as a bridged ring. The one or more polycyclic group(s) may be present in a backbone of the resin, a pendant group of the resin, or a combination thereof. In addition to the fused and bridged rings, the polycyclic polyester oligomer or polymer optionally may include one or more additional ring moieties.

Examples of suitable polycyclic groups useful in the first polycyclic polyester include bicyclic groups, tricyclic groups, and polycyclic groups including four or more rings. At least bicyclic polycyclic groups are presently preferred, with tricyclic groups being even more preferred. Most preferably, the polycyclic polyester resins of the first and second coating compositions comprise at least one polycyclic repeating unit comprising first and second fused rings that share first and second atoms in common and, in some embodiments, additionally at least one bridge ring sharing three or more atoms in common with at least one of the first and second fused rings. The rings of the polycyclic groups may be saturated (aliphatic) or unsaturated (preferably non-aromatic). Tricyclodecane is an example of a preferred, tricyclic group according to this definition. Repeating units derived from Formula A-D shown below are examples of such preferred polycyclic repeating units.

The polycyclic groups can include any combination of suitably sized ring groups. For example, the polycyclic groups may include any combination of cyclic groups having 3-atom rings, 4-atom rings, 5-atom rings, 6-atom rings, 7-atom rings, and/or 8-atom or higher rings. Typically, carbon atoms constitute a majority, or all, of the atoms making up the rings. In some embodiments, though, the polycyclic groups may include one or more heteroatoms in addition to carbon atoms (e.g., nitrogen, oxygen, silicon, sulfur, phosphorus, etc.). In certain preferred embodiments, the polycyclic groups include two or more 5-atom rings, two or more 6-atom rings, or combinations of these, e.g., at least one 5-atom ring and at least one 6-atom ring.

The amount of polyester resin component incorporated into the first and second coating compositions may vary over a wide range. The polyester resin component is typically present in each coating composition in an amount from about 5% to about 99%, preferably from about 3% to about 40%, and more preferably from about 5% to about 30% by weight based on the total weight of the resins included in the coating composition.

The amount of polycyclic content incorporated into the polycyclic polyester resins may vary over a wide range and may be expressed as the weight percent of the polycyclic content relative to the total weight of the polycyclic polyester resin. In illustrative embodiments, polycyclic groups constitute at least about 10 wt-%, more preferably at least about 20 wt-%, even more preferably at least about 30 wt-% of the first polymer. While the upper end is not especially limited, in some embodiments, the polycyclic content constitutes less than about 80 wt-%, less than about 60 wt-%, or less than about 40 wt-% of a polycyclic polyester resin.

Direct measurement of the weight of the polycyclic groups may not be reasonably feasible if determined after the polycyclic polyester resin is formed from its monomeric, oligomeric, or polymeric constituents. Accordingly, the weight percent of polycyclic content in the polycyclic polyester resin is deemed to be the weight percentage of polycylic-containing monomer(s) and polycyclic non-polymerization terminal and/or functionalizing reactants incorporated into a polycyclic polyester resin relative to the total weight of the monomers, terminal and/or functionalizing reactants used to make the polycyclic polyester resin. Separate crosslinking agents used to crosslink a polycyclic polyester resin to itself or to other resins are not included. Nor are the other resins included that are linked to a polycyclic polyester resin via crosslinking or other reaction.

For example, if a noncyclic polyester resin is formed from 100 parts by weight of reactants, and then the polyester is modified to include a polycyclic group via reaction with 5 parts by weight of a polycyclic species, then the corresponding wt-% of polycyclic content in the resultant polycyclic polyester resin is 100%×(5/(100+5)). In another example, if a cyclic polyester is formed from 100 parts by weight of reactants in which 12 parts by weight of the reactants are polycyclic, then the resultant resin includes 12% by weight of polycyclic content. This may be based on a theoretical calculation if necessary. For example, in some embodiments, bicyclic groups are incorporated into a polycyclic polyester resin via a Diels-Alder reaction of cyclopentadiene across the double bond of an unsaturated monomer (e.g., maleic anhydride) present in the backbone of the polycyclic polyester resin. In this situation, the corresponding wt-% of polycyclic content in the resin is determined by deeming the cyclopentadiene and the maleic anhydride to be polycyclic reactants.

The polycyclic polyester resin(s) may constitute all or any portion of the polyester resins included in the polyester resin component of the first and second coating compositions. If other polyester resin(s) are included these may be included in the polyester resin component in any amount. For example, some embodiments of the polyester resin component may include from 0.01 to 99.9, even from 1 to 95, or even from 10 to 95 weight percent of the polyester resin component based on the total weight of the polyester resins included in the component.

Polycyclic groups may be terminal groups, part of a resin backbone, or pendant from an intermediate portion of a resin backbone. Some non-limiting examples of suitable divalent polycyclic groups according to this formula are provided below in Formulae A (based on tricyclodecane), B (based on bicyclo[4.4.0]decane) C (based on norbornane) and D (based on isosorbide):

A.

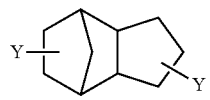

Tricyclodecane-based

B.

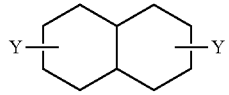

Bicyclo[4.4.0]decane-based

C.

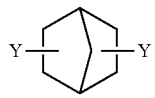

Norbornane-based

D.

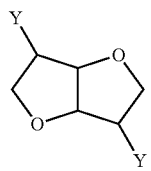

Isosorbide-based

In these formulae, each Y independently is a bond, desirably a single bond, that connects the polycyclic group to another portion of the resin. The Y bonds for each group may be pendant from the same or different rings. The isosorbide-based group, for purposes of illustration, shows each Y pendant from different rings. The above polycyclic groups are each represented as unsubstituted, aliphatic, divalent groups. That is, each of the above polycyclic groups includes first and second Y bonds. In other embodiments, such groups may include only a single Y bond. In other embodiments, such groups may include 3 or more Y bonds. It is also within the scope of the invention that variants of any of the above polycyclic structures may be used such as, for example, substituted variants thereof, unsaturated variants thereof, or structural isomers thereof (e.g., where the substituent(s) and/or heteroatom(s) are located on different positions of one or more rings). An example of an unsaturated variant of a norbornane group is a norbornene group. Additional examples of suitable polycyclic groups for use in the polymer of the present invention are provided in U.S. Application No. 2010/0260954.

In some embodiments, the one or more polycyclic groups are unsaturated bicyclic groups represented by the IUPAC (International Union of Pure and Applied Chemistry) nomenclature of Expression (I) below:

bicyclo[x.y.z]alkene, (Expression I)

wherein:
x is an integer having a value of 2 or more,
y is an integer having a value of 1 or more,
z is an integer having a value of 0 or more, and
the term alkene refers to the IUPAC nomenclature designation (e.g., hexene, heptene, heptadiene, octene, etc.) for a given bicyclic molecule and denotes that the bicyclic group includes one or more double bonds (more typically one or more carbon-carbon double bonds).

In some embodiments, z in Expression (I) is 1 or more. In other words, in certain embodiments the bicyclic groups are bridged bicyclic groups. By way of example, bicyclo[4.4.0] decane is not a bridged bicyclic structure. In some embodiments, x has a value of 2 or 3 (more preferably 2) and each of y and z independently have a value of 1 or 2. Non-limiting examples of some suitable unsaturated bicyclic groups represented by Expression (I) include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. Bicyclo[2.2.1]heptene is a presently preferred unsaturated bicyclic group.

It is contemplated that the bicyclic groups represented by Expression (I) optionally may contain one or more heteroatoms (e.g., nitrogen, oxygen, sulfur, etc.) in addition to C atoms and may be substituted to contain one or more additional substituents. For example, one or more cyclic groups (including, e.g., pendant cyclic groups and ring groups fused to a ring of a bicyclic group) or acyclic groups may be attached to the bicyclic group represented by Expression (I). Thus, for example, in some embodiments the bicyclic group of Expression (I) may be present in a tricyclic or higher group.

In some embodiments, some or all of the bicyclic groups according to Expression (I) may be saturated. Non-limiting examples of saturated bicyclics include saturated homologs of the structures represented by Expression (I) (i.e., bicyclo[x.y.z]alkane, with x, y, and z as previously described) such as, for example, bicyclo[2.1.1]hexane, bicyclo[2.2.1]heptane, bicyclo[2.2.2]octane, and bicyclo[3.2.1]octane, bicyclo[4.3.2]undecane, bicyclo[5.2.0]nonane.

Suitable polyester resins, including polycyclic polyester resins as well as polyester resins without polycyclic groups may be obtained in accordance with conventional procedures well known to those of ordinary skill in the art. According to an illustrative synthesis strategy, a polyester resin is prepared by condensation (esterification) according to known processes. See, e.g., Zeno Wicks, Jr., Frank N. Jones and S. Peter Pappas, *Organic Coatings: Science and Technology*, Vol. 1, pp. 122-132 (John Wiley & Sons: New York, 1992)]. The reaction may occur in the presence of a conventional esterification catalyst at an elevated temperature with or without solvent. Generally, resins are obtained by co-polymerizing reactants that are polyfunctional with respect to OH and/or carboxylic acid. Similarly reactive derivatives of these groups also may be used. For example, anhydrides or esters of carboxylic acid may be used. Collectively, carboxylic acid, anhydrides, esters, and other derivatives of these that are co-reactive with OH to form ester linkages shall be referred to as co-reactive carboxylate functionality. The polyester resin often is derived from a mixture of reactants containing at least two of (a) one or more polyols, preferably including at least dihydroxy and optionally trihydroxy polyols; (b) one or more compounds comprising two or more co-reactive carboxylate functionalities, preferably including at least diacid and optionally triacid functionality; and (c) one or more compounds that containing at least one OH group and at least one co-reactive carboxylate functionality such as a caprolactone reactant. At least one of such reactants preferably includes polycyclic functionality. In some modes of practice, the reactants are selected from those permitted under "21 CFR § 175.300 FDA" and/or comply with the European regulation "2002/72/EC".

In illustrative embodiments, a polycyclic reactant has the formula

  (Expression II)

wherein M is a moiety comprising at least one polycyclic group; each X independently is OH and/or co-reactive carboxylate functionality; and n is at least two, desirably 2 to 3, more desirably 2.

Examples of some suitable polycyclic-containing reactants include polycyclic-containing polyols (e.g. tricyclodecane dimethanol (TCDM), isosorbide, isomannide, or isoidide); polycyclic-containing polyacids and/or anhydrides (e.g., nadic acid or anhydride); polycyclic-containing polyamines (e.g., tricyclodecane diamine); polycyclic-containing polyisocyanates (e.g., tricyclodecane diisocyanate); and combinations thereof. Difunctional polycyclic-containing reactants are preferred in certain embodiments, with diols and diacids being particularly preferred.

In some embodiments, a reactant comprising one or more polycyclic groups is derived from plant-based materials such as, for, example corn. Examples of suitable plant-based reactants include compounds derived from sugars, with anhydrosugars being preferred, and dianhydrosugars being especially preferred. Examples of suitable such compounds include bisanhydrodexitol or isohexide compounds such as, for example:

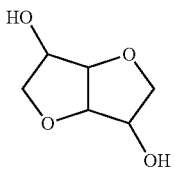

isosorbide (whose structure is depicted above), isomannide, isoidide, and derivatives or combinations thereof.

Illustrative of the polycarboxylic acids or anhydrides, that may be used to prepare the polyesters include, but are not limited to maleic acid, maleic anhydride, malonic acid, fumaric acid, succinic acid, succinic anhydride, glutaric acid, adipic acid, 2-methyl-1,6-hexanoic acid, pimelic acid, glutaric acid, methyltetrahydrophthalic acid, methylhexahydrophthalic acid, suberic acid, dodecanedioic acid, phthalic acid, phthalic anhydride, 5-tert butyl isophthalic acid, tetrahydrophthalic acid, tetrahydrophthalic anhydride, hexahydrophthalic acid, hexahydrophthalic acid, hexahydrophthalic anhydride, endomethylenetetrahydrophthalic acid, endomethylenetetrahydrophthalic anhydride, azelaic acid, sebacic acid, tetrachloro-phthalic acid, tetrachloro-phthalic anhydride, chlorendic acid, isophthalic acid, trimellitic anhydride, terephthalic acid, naphthalene dicarboxylic acid, cyclohexane-dicarboxylic acid, and mixtures thereof. In some embodiments, the alkanedioic acids may contain from 4 to 12 carbon atoms. It is also understood that an esterifiable derivative of a polycarboxylic acid, such as a dimethyl ester or anhydride of a polycarboxylic acid, can be used to prepare the polyester.

Illustrative of the glycols, triols and other polyols that can be used to prepare the polyesters include, but are not limited to ethylene glycol, diethylene glycol, triethylene glycol and higher polyethylene glycols, propylene glycol, dipropylene glycol, tripropylene glycol and higher polypropylene glycols, 1,3-propanediol, 1,4-butanediol and other butanediols, 1,5-pentanediol and other pentane diols, hexanediols, decanediols, and dodecanediols, glycerol, trimethylolpropane, neopentyl glycol, hexylene glycol, trimethylolethane, neopentyl glycol, pentaerythritol, dipentaerythritol, cyclohexanedimethanol, a polyethylene or polypropylene glycol having a number average molecular weight of about 500 or less, isopropylidene his (p-phenylene-oxypropanol-2), and mixtures thereof. In some embodiments, the aliphatic glycol may contain from 2 to about 8 carbon atoms. Other embodiments of the present invention may use aliphatic diols such as UNOXOL™ (a mixture of cis and trans 1,3- and 1,4-cyclohexanedimethanol) available from The Dow Chemical Company (Midland, Mich.). Optionally, the polyol mixture includes at least one tri-hydroxy or higher functional alcohol (e.g. triol) to provide branched polyesters.

Polyester resins can be obtained from reactants in which either OH functionality or the co-reactive carboxylate functionality is in excess. An excess of OH functionality tends to produce polyester resins with terminal OH groups. An excess of co-reactive carboxylate functionality tends to produce polyester resins in which the terminal groups are a co-reactive carboxylate functionality. Terminal OH functionality is presently more preferred.

The amount of excess functionality of OH or co-reactive carboxylate functionality, as the case may be, may vary over a wide range. In some modes of practice the molar ratio of the functionality in excess to the other functionality is in the range from 1.02 to 1.8, desirably 1.04 to 1.6. For example, in one mode of practice, an excess of OH is provided to provide a molar ratio of OH to co-reactive carboxylate functionality of 1.784. In another mode of practice, an excess of OH is used to provide a molar ratio of OH to co-reactive carboxylate functionality of 1.554.

As an alternative that provides a carboxyl-terminated polyester, it is may be preferable to use a two-step process. First, one prepares a OH-terminated polyester resin. Second, the OH terminated polyester is then reacted with a molar excess of co-reactive carboxylate functionality relative to OH functionality. The equivalent excess of co-reactive carboxylate functionality over OH functionality generally should be maintained so that the ratio of co-reactive carboxylate functionality to OH is in the range from about 1.02 to about 1.8 on a molar basis, and preferably from about 1.04 to about 1.6 on a molar basis. Optionally, a modest amount (e.g. 1-5% by weight) of a tri-functional monomer, e.g. trimellitic anhydride, is preferably added to increase the number average carboxyl-functionality of the polyester (co)polymer.

Typical polyester terminal groups (e.g. hydroxyl or carboxyl groups) may be chemically reacted or otherwise modified to produce other kinds of terminal functionality, such as terminal alkyl, ether, ester, amino-functional, amido-functional, or urea-polyester resins using conventional chemical synthesis methods known in the art. The terminal functional groups of a polyester resin are preferably selected to be hydroxyl groups.

In some modes of practice, it has been found that it is desirable to minimize the polar functionality of the polyester component. Generally both OH and the co-reactive carboxylate functionality are polar. Accordingly, in some embodiments it may be desirable to minimize polar functionality by converting the terminal groups to nonpolar functionality such as alkyl groups, alkoxy, combinations of these, and the like.

A polyester resin may have any suitable hydroxyl number. Hydroxyl numbers are typically expressed as milligrams of potassium hydroxide (KOH) equivalent to the hydroxyl content of 1 gram of the hydroxyl-containing substance. The polyester resin preferably has a hydroxyl number from about 0 to about 50, more preferably 1 to 20, even more preferably 1 to 10 mg KOH per gram of polyester resin.

A polyester resin may have an acid number over a wide range. Acid numbers are typically expressed as milligrams of KOH required to titrate a 1-gram sample to a specified end point. The range of suitable acid numbers may vary depending on a variety of considerations including, for example, whether water dispersibility is desired. The polyester resins preferably have an acid number (AN) of about 0 to about 50 mg KOH/g (co)polymer, preferably from about one to about 20 mg KOH/g (co)polymer, more preferably from about one to about 10 mg KOH/g (co)polymer.

Methods for determining acid numbers are well known in the art. For example, acid number may be determined using the titrimetric method described in ISO Standard XP-000892989. Hydroxyl number may be determined using the same standard test method, substituting a solution of hydrochloric acid in ethanol for the potassium hydroxide in ethanol titrant, and expressing the neutralization endpoint equivalents of hydrochloric acid in terms of the molar equivalents of potassium hydroxide.

The one or more polyester resin(s) may have glass transition temperature ($T_g$) selected from a wide range. Typically the polyester (co)polymer resin exhibits a glass transition temperature of from about −20° C. to about +120° C. or even higher. Polycyclic polyester resins with higher glass transition temperatures are more preferred in many embodiments wherein the Tg is in the range from 40° C. to 120° C., preferably 80° C. to 120° C. The DYNAPOL L912 polycyclic polyester resin (commercially available from Evonik Degussa GmbH, Rellinghauser Straβe 1-11 Essen, NRW 45128 Germany), for example, has a Tg of 105° C. and incorporates TCDM as a polycyclic reactant to thereby incorporate polycyclic content into the resultant resin. In the practice of the present invention, Tg characteristics may be determined using differential scanning calorimetry (DSC) techniques.

The polycyclic polyester resin(s) and other polyester resin(s) (if any) may have a number average molecular weight selected from a wide range. In illustrative embodiments, a polyester resin has a number average molecular weight in the range from about 500 to about 50,000, preferably from about 500 to about 25,000, more preferably about 1000 to about 20,000 g/mol. The commercially available DYNAPOL® L912 polycyclic polyester has a number average molecular weight of about 15,000 g/mol, an acid number of about 3 KOH/g and an OH number of about 5 KOH/g.

Each of the first and second coating compositions also preferably incorporates one or more phenolic resin(s). The term phenolic resin refers to a resin that comprises two or more phenolic repeating units. The term "phenolic" with respect to a repeating unit refers to a structure that is a residue of a reactant that comprised at least one OH directly attached to an aromatic ring structure, more typically a ring structure having six atoms in the ring (e.g., a substituted benzene ring). In many instances, a phenolic resin is obtained by reacting one or more substituted or unsubstituted phenol reactants with one or more aldehydes. Phenolic resins desirably have a number average molecular weight sufficiently high such that the resin includes 2 to 50, preferably 5 to 30, more preferably 10 to 20 phenolic repeating units on average.

Examples of phenol reactants include phenol itself as well as substituted phenols. Illustrative substituted phenols often may be mono-substituted or di-substitued. If substituted phenols are used, these are preferably mono-substituted so that two sites remain for chain growth. Examples of substituted phenols include one or more of a-cresol, p-phenylphenol, p-tert-butylphenol, p-tert-amylphenol, cyclopentylphenol, p-tertoctyl phenol, bisphenol A, resorcinol, xylenol, cresylic acid, bisphenol-F, combinations of these and the like. Examples of additional suitable substituted phenols include any of those disclosed in U.S. application Ser. Nos. 13/570,632, 13/570,743, 61/681,394, and 61/681,434.

Derivatives of these reactants, such as etherified or acid functional derivatives, also may be used. Examples of aldehydes include one or more of formaldehyde, furfural, and for acetaldehyde.

Phenolic resins generally may be classed as either novolacs or resoles. A novolac resin is a phenolic resin in which an excess of phenolic reactant is used relative to aldehyde. These are often prepared using acidic catalyst(s). Novolac resins are referred to as two stage resins as these require both heat and a curing agent for curing. A resole resin is a phenolic resin in which an excess of aldehyde is used relative to phenolic reactant. These are often prepared using alkaline catalyst(s). Resole resins are referred to as one stage resins as these can cure via heat alone without requiring the presence of a curing agent. Upon exposure to sufficient heat, resole resins are self-crosslinking. However, as an option, curing agents may still be used with resole resins if desired. Resole phenolic resins are preferred.

Suitable phenolic resins are described in Zeno Wicks, Jr., Frank N. Jones and S. Peter Pappas, *Organic Coatings: Science and Technology*, Vol. 1, pp. 184-186 (John Wiley & Sons: New York, 1992). Suitable phenolic resins also are commercially available. Examples include one or more of the resins available as BAKELITE 6470, 6535LB, 6581LB, and 6812LB products (each available from Hexion Specialty Chemicals GmbH); the DUREZ 33160, 33162 and 33310 products (Durez Corporation, Addison, Tex.); the Varcum 29-401, 2227 B 55, and 29-115 products (Durez Corporation, Addison, Tex.); PHENODUR PR 285 55/IB/B, PR 516/60B, PR 812, and PR 897 products (each available from CYTEC Surface Specialties, Smyrna, Ga.); the SANTO-LINK EP 560 product; the SFC 112 and 142 products (each available from the SI Group, previously Schenectady), and mixtures thereof. Other trade designations for phenolic resins include RESINOX™ from Monsanto Chemical Co. (St. Louis, Mo.); AROFENE™ and AROTAP™ from Ashland Chemical Co. (Dublin, Ohio).

One factor believed to impact the compatibility of phenolic resins with a particular type of polyester resin is the nature of the phenolic resin and the type of functionality incorporated into phenolic constituents, and the location of that functionality on the phenolic rings. Advantageously, the present invention uncovers combinations of phenolic resins that demonstrate excellent compatibility with polycyclic polyesters while also providing coating performance that allows the coatings to be used as alternatives to conventional coatings based on PVC and/or epoxy chemistries. The chemistries are also selected to help promote adhesion between the coatings. Without wishing to be bound by theory, it is believed that the combination of the preferred phenolic resins in each coating with a polycyclic polyester promotes interpenetration of the compositions to provide the excellent adhesion that has been observed.

For example, phenolic resins of the present invention optionally may be alkylated and/or etherified. An alkylated phenolic resin includes at least one pendant alkyl group that may be linear, branched, or cyclic. Exemplary alkyl groups have 1 to 10, preferably 1 to 5 carbon atoms, more preferably 1 to 4 carbon atoms.

A cresol resin is one kind of alkylated phenolic resin that is derived from a substituted phenol having a methyl group substituted onto the ring of the phenol. Much of the world's supply of cresol occurs naturally. When made synthetically, it is typically prepared either by methylation of phenol, or by hydrolysis of chlorotoluene. Depending upon temperature, a cresol resin may be a solid or a liquid because its melting point is close to room temperature. Both novolac and resole resins can incorporate cresol content. In some embodiments, a cresol resole phenolic resin is incorporated into at least one of the first and second coating compositions.

Etherified phenolic resins include one or more pendant ether and/or pendant polyether moieites. Phenolic resins, such as resins resulting from the reaction of phenol and formaldehyde, typically have pendant methylol groups. Often, it is such methylol groups that are etherified. In such resins in which a methylol group is etherified, the ether group is not directly linked to the aromatic group. Preferred etherified phenolic resins include ethers of the formula —OR, wherein R is an alkyl group of 1 to 10, preferably 1 to 6, more preferably 1 to 4 carbon atoms. In exemplary embodiments, R is methyl, ethyl, propyl, i-propyl, n-butyl, i-butyl, and/or t-butyl. Preferably, R is n-butyl.

In some embodiments, the first coating composition includes at least one alkylated resole phenolic resin, such as a resin incorporating cresol content, and at least one other kind of resole phenolic resin. Such other kind of resole resin preferably does not include pendant alkyl groups. In some embodiments, such other kind of resole resin preferably is not alkylated or etherified. A phenolic resin that is not alkylated is referred to as being non-alkylated. A phenolic resin that is not etherified is referred to as being non-etherified.

In one illustrative formulation, the first coating composition includes (a) 15 to 30, preferably 22 weight percent of at least one polycyclic polyester; (b) 5 to 20, preferably 11 weight percent of one or more phenolic resins: (c) 0 to 10 preferably 5 weight percent of a filler particle such as $TiO_2$; (d) a sufficient amount of an additive such as a wax to help extend life of tooling used to form coated substrates into closure shapes; and (e) about 40 to 70 preferably about 60 weight percent of a suitable solvent such as xylene.

In some embodiments, the second coating composition includes at least one alkylated resole phenolic resin and at least one resole phenolic resin that is non-alkylated. The weight ratio of the alkylated phenolic resin to the non-alkylated phenolic resin desirably is in the range from 1:50 to 50:1, preferably 1:10 to 10:1, more preferably 1:3 to 3:1. In some embodiments, the second coating composition includes at least one etherified resole phenolic resin and at least one resole phenolic resin that is non-etherified. The weight ratio of the etherified phenolic resin to the non-etherified phenolic resin desirably is in the range from 1:50 to 50:1, preferably 1:10 to 10:1, more preferably 1:3 to 3:1. In some embodiments, the second coating composition includes at least one alkylated resole phenolic resin and at least one etherified resole phenolic resin. The weight ratio of the alkylated phenolic resin to the etherified phenolic resin desirably is in the range from 1:50 to 50:1, preferably 1:10 to 10:1, more preferably 1:3 to 3:1. In one embodiment, the weight ratio of the at least one polycyclic polyester resin in the second coating to the total amount of the phenolic resins is in the range from 1:50 to 50:1, preferably 1:4 to 4:1, even more preferably about 1.6:1.

In one illustrative formulation, the second coating composition includes (a) 15 to 30, preferably 22 weight percent of a polycyclic polyester; (b) 5 to 20, preferably 14 weight percent of one or more phenolic resins; (c) 0 to 15, preferably 10 weight percent of a filler particle such as $TiO_2$; (d) optionally a sufficient amount of a low molecular weight resin that promotes adhesion to the first coating and/or sealing material applied to the second coating; (e) optionally a sufficient amount of a blocked isocyanate resin effective to improve blush resistance; (f) optionally a sufficient amount of an antifoaming agent effective to help control foaming;

and (g) about 40 to 70 preferably about 60 weight percent of a suitable solvent such as xylene.

The combinations of phenolic resins used in the second coating compositions provides compositions with moderate crosslinking characteristics to enhance adhesion to sealing compounds even when the second coating composition is substantially free of PVC content. This is advantageous to avoid PVC content, as previously PVC has been used widely in top coats to obtain suitable adhesion characteristics. In contrast, if the crosslink density is too high, adhesion could be reduced more than would be desired. The combinations of phenolic resins, further in combination with the polycyclic polyester resin(s) also contribute to corrosion resistance.

Without wishing to be bound by theory, it is believed that the ether functionality of the phenolic resin(s) used in the second coating composition helps to provide resultant coatings that show excellent adhesion to sealing compounds used as closure gaskets without having to use PVC or epoxy chemistries in the second coating composition. Conventionally, many gasket materials are PVC-based and do not show good adhesion to coatings unless those coatings incorporate PVC or epoxy resins. By using a polycyclic polyester in combination with these phenolic resins, the second coating composition can replace conventional PVC-based organosol coatings as a topcoat that exhibit excellent adhesion to gasket materials, including PVC-based gasket materials.

Preferably, each phenolic resin used in the first and second coating compositions is substantially free of mobile BPA, BPF and derivatives thereof whether or not such derivatives are mobile. The combination provides enhanced corrosion resistance without being too soft. The combination also contributes to flexibility and adhesion to allow coated substrates to be formed into closure shapes after coating. The combination also is compatible with the polycyclic polyester resin component. The weight ratio of the cresol phenolic resin to the non-cresol phenolic resin preferably is in the range from 1:50 to 50:1, more preferably 1:10 to 10:1, and even more preferably 1:3 to 3:1. In some embodiments, the non-cresol resin is optional. In one embodiment, the weight ratio of the at least one polyester resin in the first coating to the total amount of the cresol resole and non-cresol resole phenolic resins is in the range from 1:50 to 50:1, preferably 1:4 to 4:1, even more preferably about 2:1. By using a polycyclic polyester in combination with these phenolic resins, the first coating composition can replace conventional PVC-based organosol coatings.

If desired, the first and/or second coating compositions may optionally include other additives that help to improve the manufacturability or use of the coating compositions or that help to improve the resultant coatings. The optional additives are preferably at least substantially free of polyvinyl chloride containing materials, mobile and bound bisphenol A and F, mobile and bound aromatic glycidyl ether compounds, and mobile and bound oxirane-containing compounds.

Suitable optional additives include, for example, those that improve the processability or manufacturability of the composition, enhance composition aesthetics, or improve a particular functional property or characteristic of the coating composition or the cured composition resulting therefrom, such as adhesion to a substrate or adjacent composition. Additives that may be included are carriers, additional polymers, emulsifiers, pigments, metal powders or pastes, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents or combinations thereof. Other optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, and mixtures thereof. Each optional ingredient can be included in a sufficient amount to serve its intended purpose, but preferably not in such an amount to adversely affect a coating composition or a cured coating resulting therefrom.

One optional ingredient is a catalyst to increase the rate of crosslinking of the phenolic resins. If used, a catalyst is preferably present in an amount of at least 0.05%, and more preferably at least 0.1%, by weight of nonvolatile material. If used, a catalyst is preferably present in an amount of at most 1%, and more preferably at most 0.5%, by weight of nonvolatile material.

Examples of catalysts, include, but are not limited to, strong acids (e.g., dodecylbenzene sulphonic acid (ddbsa, available as CYCAT 600), methane sulfonic acid (msa), p-toluene sulfonic acid (ptsa), dinonylnaphthalene disulfonic acid (dnndsa), and triflic acid), quaternary ammonium compounds, phosphorous compounds, zinc compounds, like a tetraalkyl ammonium halide, a tetraalkyl or tetraaryl phosphonium iodide or acetate, tin octoate, zinc octoate, triphenylphosphine, and similar catalysts known to persons skilled in the art.

Another useful optional ingredient is a lubricant, like a wax, which facilitates manufacture of metal closures by imparting lubricity to sheets of coated metal substrate. Waxes also may provide coatings with scratch resistance. A lubricant is preferably present in the coating composition in an amount of 0 to 2%, and preferably 0.1 to 2%, by weight of nonvolatile material. Preferred lubricants include, for example, Carnauba wax and polyethylene type lubricants.

The first and/or second coating compositions may incorporate one or more pigments. Examples include aluminum flake, zinc oxide and titanium dioxide, and combinations of these. Such pigments may protect against headspace corrosion and darkening of the interior container liner, for example, by acting to scavenge hydrogen sulfide emitted by packaged foodstuffs. If pigments are used, the resulting coating composition often may have a pigment-to-resin ratio of about 1:50 to 1:6, preferably 1:20 to 1:6, more preferably 1:15 to 1:6.

The removable closure of the invention also may include a sealing composition, sometimes also referred to as a gasket. The sealing composition is a material that is applied to at least a portion of the top or exposed surface of the second coating for the purpose of assisting in sealing the closure to a container. Structurally, a closure utilizing a sealing composition would comprise a substrate, the first coating directly or indirectly on a surface of the substrate, the second coating directly or indirectly on the first coating, and the sealing composition directly or indirectly on the second coating.

Generally, sealing compositions are well known in the industry and any may be used. Some are solid components as applied. Others are fluids that chemically or physically cure to form solid gasketing material. As an example, a sealing composition may comprise at least about 10, more preferably at least about 25, and even more preferably at least about 30 wt-% of thermoplastic material, based on the total nonvolatile weight of the of the sealing composition. Preferably, the sealing composition includes less than about 60, more preferably less than about 55, and even more preferably less than about 50 weight percent ("wt-%") of thermoplastic material, based on the total nonvolatile weight of the compound. While not intending to be bound by any theory, in some embodiments, the incorporation of a suitable amount of thermoplastic material into the closure compound is believed to be important in achieving good compatibility and adhesion between a sealing composition and second coating of the closure.

Examples of useful sealing composition include, for example, PVC-containing sealing compositions (including, e.g., plastisols) for sealing closures to food or beverage containers. In some embodiments, the sealing composition may contain a polypropylene additive. Preferred sealing compositions are at least substantially free of mobile or bound PVC, bisphenol A or F and aromatic glycidyl ether compounds.

The total film thickness of each of the first and second coatings of the cured coating systems of the present invention may vary depending upon a variety of factors, including, for example, the desired properties (e.g., mechanical properties, aesthetic properties, corrosion resistance, etc.) of the cured coating system, the substrate upon which the coating system is applied, the presence of substances that may contact the cured coating system (e.g., certain aggressive or corrosive products), and/or the intended use of the coated article. In presently preferred embodiments, the total dry film weight of the each of the first and second coatings independently is at least about 5, more preferably at least about 10, and even more preferably at least about 15 g/m$^2$ (grams per square meter). Preferably, the total dry film weight of the cured coating system is less than about 40, more preferably less than about 30, and even more preferably less than about 25 g/m$^2$.

Preferably, each of the first and second coating compositions comprises a liquid carrier. In preferred embodiments, the coating compositions of the present invention are organosols or plastisols, more preferably organosols, and even more preferably vinyl organosols. In illustrative embodiments, each of the first and second coating compositions independently includes from 30 to 95, preferably from 40 to 80, more preferably from 50 to 70 weight percent of liquid carrier based on the total weight of the composition.

The carrier liquid is typically at least substantially nonaqueous. While not preferred, in some embodiments a relatively low amount of water may be included so long as the coating composition is not unsuitably affected. In illustrative embodiments, the liquid carrier includes less than 2 weight percent water, if any, based on the total weight of the liquid carrier.

Examples of suitable liquid carriers include an organic solvent, a plasticizer, or mixtures thereof. Suitable organic solvents include, for example, aliphatic hydrocarbons, like mineral spirits, kerosene, and high flash VM&P naphtha; aromatic hydrocarbons, like toluene, benzene, xylene and blends thereof (e.g., the Aromatic Solvent 100 product); alcohols, like isopropyl alcohol, n-butyl alcohol, and ethyl alcohol; ketones, like cyclohexanone, ethyl aryl ketones, methyl aryl ketones, and methyl isoamyl ketone; esters, like alkyl acetates (e.g. ethyl acetate and butyl acetate); glycol ethers like ethylene glycol monomethyl ether, ethylene glycol monoethyl ether, ethylene glycol monobutyl ether, and propylene glycol monomethyl ether; glycol ether esters, like propylene glycol monomethyl ether acetate; aprotic solvents, like tetrahydrofuran; chlorinated solvents; mixtures of these solvents and the like. Preferred liquid carriers have sufficient volatility to evaporate substantially from the coating system during the curing process.

Examples of suitable plasticizers include phosphates, adipates, sebacates, epoxidized oils (not preferred, but may be used in certain embodiments if desired), polyesters, and combinations thereof.

The coating compositions optionally include at least one component to help stabilize dispersion of the ingredients in the liquid carrier. Such components are referred to herein as "stabilizers." The first and second coating compositions can include any type of stabilizer. In certain embodiments, the compositions preferably include one or more stabilizers preferably capable of stabilizing (i) the liquid dispersion prior to and during coating application, (ii) the dispersion during the curing process, and/or (iii) the cured coating composition. In a preferred embodiment, both the compositions contain a stabilizer (or a combination of stabilizers) capable of achieving all of the above (i), (ii) and (iii).

Preferred stabilizers are substantially free of mobile or bound PVC, BPA, BPF, and oxirane-containing compounds. While not preferred, stabilizers containing BPA, BADGE, and/or other oxirane-containing compounds may be used, if desired.

The coating compositions may include any suitable amount of one or more stabilizer to achieve the desired result. In some embodiments, the coating composition include at least about 0.1, more preferably at least about 5 of stabilizer based on the total nonvolatile weight of the coating compositions. Preferably, the coating compositions of the present invention include less than about 25, more preferably less than about 20, and even more preferably less than about 10 wt-% of stabilizer based on the total nonvolatile weight of the respective composition.

Coating compositions for use in the present coating system can be prepared using any suitable method to preferably provide sufficient suspension and dispersion of the components included therein. Examples of suitable process methods include solution blending, high-speed dispersion, high-speed milling, and the like. A substantially homogeneous dispersion of the components throughout a liquid carrier typically indicates an adequate mixture or blend.

Preferably, the cured systems are retortable when used in food and beverage container applications. Preferred cured coatings of the present invention can withstand elevated temperature conditions frequently associated with retort processes or other food or beverage preservation or sterilization processes. As discussed above, particularly preferred cured coating systems exhibit enhanced resistance to such conditions while in contact with food or beverage products that exhibit one or more aggressive (or corrosive) chemical properties under such conditions.

The coating system of the present invention can be applied to a substrate using any suitable procedure such as, for example, spray coating, roll coating, coil coating, curtain coating, immersion coating, meniscus coating, kiss coating, blade coating, knife coating, dip coating, slot coating, slide coating, and the like, as well as other types of pre-metered coating. In one embodiment where the coating is used to coat metal sheets or coils, the coating can be applied by roll coating.

The coating system can be applied to a substrate prior to, or after, forming the substrate into an article. The substrate is typically coated prior to forming the substrate into an article (although, if desired, the substrate can be coated after forming the substrate into a closure). Preferably, at least a portion of the substrate is coated with the coating system of the present invention, which is then at least partially cured before the substrate is formed into an article. In presently preferred embodiments, the following method is used: (1) the first coating composition is applied to at least a portion of the substrate, (2) the first coating composition is then cured, (3) the second coating composition is applied to the cured first coating composition, and (4) the second coating composition is then cured to produce a cured coating system. Alternatively, the method may include (a) applying the first coating composition to at least a portion of the substrate, (b) drying the first coating composition (which may result in at least partial crosslinking), (c) applying the second coating composition to the first coating composition (or to one or more optional intermediate layers applied to the first coating composition), and (d) curing the coating system to produce a cured coating system. A sealing compound is then optionally applied to the second coating to help provide a gasket for sealing the closure to its corresponding container.

In some embodiments, multiple layers of the first and/or second coating composition may be applied.

The preferred method of applying the first and second coating compositions to the metal substrate is a coating method selected from roll coating and spray coating. In some embodiments of this method, the coating compositions on the surface of the metal substrate are at least partially cross-linked (i.e. hardened or cured) by exposure to heat, actinic radiation (e.g. ultraviolet or infrared curing), electromagnetic radiation (e.g. electron beam curing), combinations thereof and the like. In certain preferred embodiments, the first coating composition on the metal substrate is at least partially cross-linked before applying the second coating composition. However, other methods of applying the coating compositions may be used as will be understood by one of skill in the art.

Coating systems of the present invention are preferably cured to form a hardened coating system. After applying the coating system onto a substrate, the coating compositions of the present invention can be cured using a variety of processes, including, for example, oven baking by either conventional or convectional methods, or any other method that provides an elevated temperature that preferably allows the thermoplastic material particles to fuse together. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions can be dried and cured in one step.

The curing process may be performed at temperatures in the range of about 177° C. to about 232° C. for about 5 seconds to 1 hour, preferably about 3 minutes to about 15 minutes, preferably about 3 minutes seconds to about 10 minutes, taking into account, however that the upper end of the temperature range can change depending on the decomposition temperature(s) of the coating constituents.

FIG. 1 schematically shows a cross-section of an illustrative closure 10 of the present invention. Closure 10 in this embodiment is the type of circular closure that functions as a lid on a glass jar such as a pickle or sauerkraut container. Closure 10 includes substrate 12 that has annular sidewall 14 extending from the rim 15 of circular panel 16. In an actual closure, the sidewall 14 would include features such as threading features (not shown) by which closure 10 would threadably engage corresponding thread features (not shown) of a corresponding container (not shown).

A coating system of the present invention is provided on the interior surfaces 17 and 19 of sidewall 14 and panel 16. The coating system includes a first coating 18 formed from a first coating composition of the present invention and a second coating 20 formed from a second coating composition of the present invention. Annular gasket 22 is provided on the second coating 20. When closure 10 seals the corresponding container, the gasket sealingly engages the rim (not shown) of the container for a more secure seal.

EXAMPLE 1

Preparing Coated Closures

Coated closures are prepared according to the procedure of this Example 1 using the primer coating compositions described in Example 2 and the top coating compositions described in Example 3. To prepare each coated closure, a flat, electrolytic tinplate (ETP) sheet is coated with a two-coat system. First a primer coating composition is applied onto the sheet at 8 to 9 grams/m$^2$ (gsm or g/m$^2$) based on the weight of the resultant dry coating. The coated materials are cured for 10 minutes at 200° C. peak metal temperature (PMT) to form a primer coating (A primer coating also is referred to as a size coating herein.). A top coat composition is applied over the primer coating at 8 to 9 g/m$^2$ and then cured for 10 minutes at 195° C. PMT. The panels also are overcured for 20 minutes at 180° C. to 190° C. with a varnish on the other side of the ETP sheet to simulate external decoration. The overcuring occurs either (a) when only the primer coating has been formed; or (b) after both the primer and top coatings have been formed. After formation of the primer, top, and varnish coatings, the coated sheet is stamped to form a closure having a channel around the inside perimeter to receive gasket material. After stamping, liquid gasket compound is applied in the channel of the closure and cured.

The closures are tested according to the following protocols, and the results are included below in Examples 2 and 3. All parts and percentages referred to in Examples 2 and 3 are by weight unless otherwise expressly noted. The molecular weight is number average molecular weight.

Corrosion test: This test evaluates the degree of corrosion resistance of the coated closures. Jars are filled with solutions which simulate different types of representative food. The jars are closed with the closures to be tested. For each coated closure system, a minimum of 6 closures are tested. Closed jars are stored at room temperature, 35° C. or 40° C. depending of the solution used for the test. On a periodic basis (e.g., every week or 2 weeks), the closures are examined to determine the degree to which corrosion can be visually noticed. The resistance characteristics of the different systems are then compared. The following notation is used to indicate the results: + means the best, ± means medium performance, and − means the worst.

Compound adhesion test: This test evaluates whether the gasket compound will be adherent enough to the top coating in order to help ensure a good vacuum during sterilization or pasteurization of filled jars fitted with the closures. At the lab scale, a strip of liquid compound is applied at a determined thickness (from about 1 mm to about 2 mm on a wet basis) on a flat panel coated with the coating system to be checked. The compound is cured for 90 seconds at an appropriate temperature (depending on the compound tested). After cooling, the compound is pulled off the panel to assess the force required to do so. The compound adhesion is noted on a scale from 0 to 5 (0: very poor adhesion. 5: excellent adhesion).

Appearance of the top surface of the primer coat: After curing of the primer coat, the general appearance of the top surface is examined for characteristics such as, for example, pinholing, dewetting, gloss, etc. The overall appearance of the top surface after making these assessments is rated on a scale from 0 to 5 (0: poor appearance. 5: excellent appearance).

Blush resistance: This test evaluates the blush resistance of a coating system in terms of how moisture and heat might impact gloss (e.g., gloss could be affected to the extent that water is introduced into the cured film). A greater impact on gloss indicates less blush resistance. The blush resistance is checked by retorting a coated sheet sample in tap water or a specified solution (for example: water+salt at a specified concentration) for 1 hour at 130° C. After cooling, the gloss of the area immersed in water is checked to assess the impact on gloss. The same visual inspection is made on the area which was in vapor. The blush resistance is noted on a scale from 0 to 5 (0: poor blush resistance. 5: excellent blush resistance).

Blistering: This test involves retorting coated, gasketed closures on closed jars and then observing the degree to which the gasket compound blisters. The jars are filled with water and closed under steam with the closure to be tested. The jars are retorted for 1 hour at 130° C. When the jar contents have cooled to room temperature (generally the day after the retorting), the jars are opened and the samples are observed to assess blistering on a scale from 0 to 5 (0 if there is strong blistering, 5 if there is no blistering).

EXAMPLE 2

Primer Coating Compositions

Sample primer coating compositions (Coatings 1 to 4) are prepared from the following recipes:

TABLE 2.1

| Ingredients | coating 1 | coating 2 | coating 3 | coating 4 |
| --- | --- | --- | --- | --- |
| Polyester 1: linear, hydroxylated | 20-30% | — | — | — |
| Polyester 2: Hydroxylated, linear polyester | — | 20-30% | — | — |
| Polyester 3: Hydrolxylated, polycyclic, linear polyester | — | — | 20-30% | — |
| Polyester 4: Hydroxylated, linear polyester | — | — | — | 20-30% |
| Solvent mixture | 40-50% | 40-50% | 40-50% | 40-50% |
| TiO$_2$ | 5-15% | 5-15% | 5-15% | 5-15% |
| Crosslinker 1: phenolic resin, resole type | 5-15% | 5-15% | 5-15% | 5-15% |
| Crosslinker 2: phenolic resin, resole type | 5-10% | 5-10% | 5-10% | 5-10% |
| Wax: polyethylene/ polytetrafluoroethylene waxes, in dispersion 20% NVC | 0.5-1.5% | 0.5-1.5% | 0.5-1.5% | 0.5-1.5% |
| Lubricant: natural high molecular weight fatty esters | 0-1% | 0-1% | 0-1% | 0-1% |

TABLE 2.2

| ingredients | MW | OH value (mgKOH/g) | acid value (mgKOH/g) |
| --- | --- | --- | --- |
| Polyester 1 | 18000 | 5 | <4 |
| Polyester 2 | 16000 | 5 | 2 |
| Polyester 3 | 15000 | 5 | 3 |
| Polyester 4 | 15000 | 6 | 2 |

The solid polyester resin is dissolved under high speed stirring in the solvent mixture for around 3 hours until the dissolution is finished. After cooling, the titanium dioxide is dispersed in a part of this polyester resin solution by high speed stirring. High speed dispersion is maintained until fineness of dispersion <15 microns. Then, the dispersion is added to the remaining polyester solution. This mixture is cooled down below 40° C., if desired, e.g., to avoid premature crosslinking of the phenolic resin(s) when these are added as crosslinker(s). Crosslinkers, wax and lubricant are then added one after the other with thorough, manual stirring between each ingredient.

Coatings 1 to 4 are applied on tinplate sheet using the process described in Example 1. Next, a top coat was formed on each sample. For all four samples, the same top coat composition was used. This was a conventional topcoat formulation including a PVC resin and a non-polycyclic polyester. This topcoat was used to help initially identify which of coatings 1 to 4 performs best as a size coat. Coating 3 was selected as the best size coat based on assessing the corrosion resistance and compound adhesion of the coating systems. The results are provided in the following Table 2.3:

|  | coating 1 | coating 2 | coating 3 | coating 4 |
|---|---|---|---|---|
| Corrosion resistance in 3% acetic acid solution: | | | | |
| After 1 week at 40° C. | Ok | Bubbles at the featheredge | ok | Slight bubbles at the featheredge |
| After 4 weeks at 40° C. | Corrosion at the featheredge | — | ok | — |
| Compound adhesion on the system | | | | |
| Before sterilisation | 5 | 5 | 5 | 5 |

Conclusion: In the tests described above, Coating 3 containing the linear, hydroxylated, polycyclic polyester 3 is preferred as it shows the best overall performance in terms of both corrosion resistance and adhesion. The other coatings showed comparable adhesion, but had worse corrosion resistance.

EXAMPLE 3

Top Coat Compositions

Example top coating compositions (coatings 5 to 10) are prepared from the following recipes shown in Tables 3.1 and Table 3.3. Due to the performance of the polycyclic polyester 3 in coating 3 in Example 2, a primer coating composition (referred to herein as Primer Coating A) was used that included polycyclic polyester 3, and a mixture of a resole phenolic crosslinker resin and a second resole phenolic crosslinker resin that was partially etherified with butanol. Primer Coating A was used as a primer base coating for each of the top coatings 5 to 10. The coating systems were formed using the procedure of Example 1.

TABLE 3.1

| Ingredients | coating 5 | coating 6 | coating 7 |
|---|---|---|---|
| Polyester 3: Hydrolxylated polycyclic linear polyester | 20-30% | 20-30% | 20-30% |
| Solvent mixture | 40-50% | 40-50% | 40-50% |
| TiO$_2$ | 20-25% | 20-25% | 20-25% |
| Additive: Adhesion polyester resin | 0-2% | 0-2% | 0-2% |
| Polyethylene wax dispersion | 0-1% | 0-1% | 0-1% |
| Blocked cycloaliphatic polyisocyanate | 0-2% | 0-2% | 0-2% |
| Crosslinker 3: Phenol formaldehyde resin resole type | 2-7% | — | — |
| Crosslinker 4: Butyl etherified phenolic resin, resole type | — | 2-7% | — |
| Crosslinker 5: Alkylated phenolic resin, resole type | — | — | 2-7% |

To prepare top coatings 5 to 7, the solid polyester resin is dissolved under high speed stirring in the solvent mixture for around 3 hours. After cooling, the titanium dioxide is dispersed in a part of this polyester resin solution by high speed stirring. High speed dispersion is maintained until fineness of dispersion <15 microns. Then, the dispersion is added to the remaining polyester solution. This mixture is cooled down below 40° C. if desired to avoid premature crosslinking of the phenolic resins when these are added. All the other ingredients are then added one after the other with thorough, manual stirring between each ingredient. The top coat is applied using the conditions described in Example 1 at 9 g/m$^2$ on Primer coating 11. Characteristics of coatings 5 to 7 are reporting in Table 3.2:

TABLE 3.2

|  | coating 5 | coating 6 | coating 7 |
|---|---|---|---|
| Corrosion resistance | − | ± | + |

Conclusion: The results show that using an etherified phenolic resin in the topcoat in combination with a polycyclic polyester provides coating 6 with a level of corrosion resistance that coating 5 fails to achieve. The best corrosion resistance results by using both linear, hydroxylated, polycyclic polyester in combination with alkylated phenolic resin in the top coat as shown by the corrosion resistance of coating 7.

Top coatings 8 to 10 had the following formulations shown in Table 3.3:

TABLE 3.3

| Ingredients | coating 8 | coating 9 | coating 10 |
|---|---|---|---|
| Polyester 3: Hydrolxylated polycyclic linear polyester | 19-25% | 19-25% | 19-25% |
| Solvent mixture | 40-50% | 40-50% | 40-50% |
| TiO$_2$ | 19-25% | 19-25% | 19-25% |
| Adhesion polyester resin | 0-2% | 0-2% | 0-2% |
| Polyethylene wax dispersion | 0-1% | 0-1% | 0-1% |
| Blocked cycloaliphatic polyisocyanate | 0-2% | 0-2% | 0-2% |
| Crosslinker 4: Butyl etherified phenolic resin, resole type | 4-5% | 4-5% | 8-9% |
| Crosslinker 5: Alkylated phenolic resin, resole type | 4-5% | 2-3% | 2-3% |

To prepare top coatings 8 to 10, the solid polyester resin is dissolved under high speed stirring in the solvent mixture for around 3 hours. After cooling, the titanium dioxide is dispersed in a part of this polyester resin solution by high speed stirring. High speed dispersion is maintained until fineness of dispersion <15 microns. Then, the dispersion is added to the remaining polyester solution. This mixture is cooled down below 40° C. if desired to avoid premature crosslinking of the phenolic resins when these are added. All the other ingredients are then added one after the other with thorough, manual stirring between each ingredient. Each top coating is applied using the conditions described in Example 1 at 9 g/m$^2$ on Primer Coating A. Characteristics of the top coatings 8 to 10 are reporting in Table 3.4. For comparison, characteristics for a conventional top coating composition that is BPA-free also were evaluated and reported in Table 3.4:

TABLE 3.4

|  | coating 8 | coating 9 | coating 10 | STD BPA free system |
|---|---|---|---|---|
| Compound adhesion | 1 | 5 | 5 | 2.5 |
| Blistering | 4.5 | 2.5 | 4.5 | 5 |

The data in Table 3.4 shows that using a combination of both an etherified resole phenolic resin and an alkylated resole phenolic resin in combination with a hydroxylated, linear, polycyclic polyester resin provides compound adhesion and blistering resistance comparable to a conventional BPA-free system and performs even better than the conventional system when the weight ratio of the etherified phenolic resin to the alkylated phenolic resin is at least 2:1, preferably at least 2:1 to 50:1, more preferably at least 2:1 to 10:1.

All patents, patent applications, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A removable closure for a packaging article comprising a container, said closure comprising:
    (a) a substrate having an interior and an exterior surface;
    (b) a first, at least partially cured coating provided on at least a portion of the interior surface of the substrate, said first coating derived from ingredients comprising:
        (i) at least one first polycyclic polyester, wherein the polycyclic polyester comprises first and second fused rings that share at least one atom in common; and
        (ii) at least one first crosslinkable phenolic resin; and
    (c) a second at least partially cured coating provided directly or indirectly onto at least a portion of the first coating, said second coating derived from ingredients comprising:
        (i) at least one second polycyclic polyester; and
        (ii) at least one second crosslinkable phenolic resin comprising an etherified phenolic resin, an alkylated phenolic resin, or a combination thereof,
        wherein the first coating and the second coating are different based on at least (1) the first crosslinkable phenolic resin being different than the second crosslinkable phenolic resin, or both (1) and (2) the first polycyclic polyester being different than the second polycyclic polyester;
        wherein at least one of the first and second coating compositions is substantially free of polyvinyl chloride; and
    (d) a gasket applied directly onto at least a portion of the second coating in a manner effective to help the closure sealingly engage the container.

2. The removable closure of claim 1, wherein both of the first and second coating compositions are substantially free of bisphenol A and aromatic glycidyl ether compounds.

3. The removable closure of claim 1, wherein (a) the first coating composition comprises at least one cresol resole phenolic resin and at least one non-cresol resole phenolic resin, and (b) the second coating composition comprises at least one etherified phenolic resin and at least one non-etherified phenolic resin.

4. The removable closure of claim 1, wherein the first, second, or both first and second polycyclic polyester resin has a Tg in the range from 80° C. to 120° C.

5. The removable closure of claim 1, wherein the gasket comprises a PVC resin.

6. The removable closure of claim 1, wherein the polycyclic polyester resin has a backbone and a plurality of polycyclic moieties are incorporated into the backbone.

7. The removable closure of claim 1, wherein at least one of the first and second coatings has a thickness in the range from 0.01 μm to 0.5 mm.

8. The removable closure of claim 1, wherein the fused rings of the first, second, or both first and second polycyclic polyester share at least two atoms in common.

9. The removable closure of claim 1, wherein the at least one first crosslinkable phenolic resin of the first coating composition comprises a non-etherified or non-alkylated phenolic resin.

10. The removable closure of claim 1, wherein the at least one second crosslinkable phenolic resin of the second coating composition comprises an alkylated phenolic resin.

11. The removable closure of claim 1, wherein the second coating composition comprises both the etherified phenolic resin and the alkylated phenolic resin which are present in the second coating composition at a weight ratio in the range of 2:1 to 50:1, respectively.

12. The removable closure of claim 1 wherein the first polycyclic polyester further comprises at least one bridge ring sharing three or more atoms in common with at least one of the first and second fused rings.

13. The removable closure of claim 12 wherein the second polycyclic polyester comprises first and second fused rings that share two atoms in common and at least one bridge ring sharing three or more atoms in common with at least one of the first and second fused rings.

14. The removable closure of claim 1, wherein both of the first and second coating compositions are substantially free of polyvinyl chloride.

15. The removable closure of claim 14, wherein the first and second coating compositions are substantially free of mobile and bound bisphenol A, mobile and bound bisphenol F, mobile and bound BADGE, and mobile and bound BFDGE.

16. The removable closure of claim 1, wherein the first, second, or both first and second polycyclic polyester comprises one or more polycyclic groups selected from

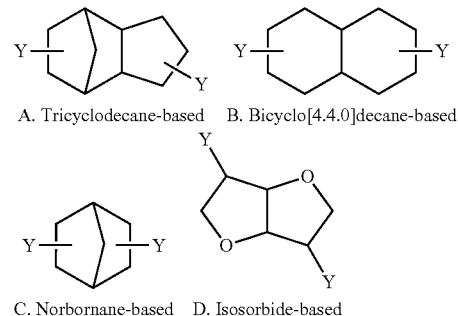

A. Tricyclodecane-based  B. Bicyclo[4.4.0]decane-based

C. Norbornane-based  D. Isosorbide-based wherein each Y independently is a bond that connects the polycyclic group to another portion of the resin.

17. The removable closure of claim 16, wherein the polycyclic groups of the first and second polycyclic polyesters comprise

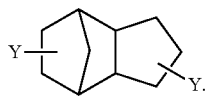

A. Tricyclodecane-based

18. A package comprising a container and a closure according to claim 1, wherein the closure sealingly engages the container in a manner effective to define an interior volume.

19. The package of claim 18, wherein at least a portion of the container comprises a glass.

20. The package of claim 18, wherein a food item or a beverage is stored in the package.

21. The package of claim 20, wherein the food item or the beverage is acidic.

22. A method of making a removable closure for packaging article, comprising the steps of:
(a) providing a first coating composition, said first coating composition being derived from ingredients comprising:
(i) at least one first polycyclic polyester resin wherein the polycyclic polyester comprises first and second fused rings that share at least two atoms in common; and
(ii) at least one first crosslinkable phenolic resin; and
(b) providing a second coating composition, said second coating composition being derived from ingredients comprising:
(i) at least one second polycyclic polyester; and
(ii) at least one second crosslinkable phenolic resin comprising an etherified phenolic resin, an alkylated phenolic resin, or a combination thereof,
wherein the first coating and the second coating are different based on at least (1) the first crosslinkable phenolic resin being different than the second crosslinkable phenolic resin, or both (1) and (2) the first polycyclic polyester being different than the second polycyclic polyester;
wherein at least one of the first and second coating compositions is substantially free of polyvinyl chloride; and
(c) providing a substrate; and
(d) using the first and second coating compositions to form first and second coatings, respectively, on at least a portion of a surface of the substrate, wherein the first coating functions as a basecoat for the second coating and wherein the first coating and the second coating are different; and
(e) optionally, at least partially curing the first and second coating compositions, and
(f) applying a gasket directly onto at least a portion of the second coating.

23. A removable closure for a packaging article, said closure comprising:
(a) a substrate having an interior and an exterior surface;
(b) a first at least partially cured coating applied onto at least a portion of the interior surface of the substrate, said first coating derived from ingredients comprising:
(i) at least one first polycyclic polyester, wherein the polycyclic polyester comprises first and second fused rings that share at least two atoms in common, and at least one bridge ring sharing three or more atoms in common with at least one of the first and second fused rings; and
(ii) at least one first crosslinkable phenolic resin comprising at least one cresol resole phenolic resin and at least one non-cresol resole phenolic resin, wherein the cresol and the resole phenolic resins are crosslinkable with each other; and
(c) a second at least partially cured coating applied directly or indirectly onto at least a portion of the first coating, said second coating derived from ingredients comprising:
(i) at least one second polycyclic polyester wherein the polycyclic groups comprise first and second fused rings that share two atoms in common, and at least one bridge ring sharing three or more atoms in common with at least one of the first and second fused rings; and
(ii) at least one second crosslinkable phenolic resin comprising at least one etherified phenolic resin and at least one non-etherified phenolic resin, wherein the etherified and the non-etherified phenolic resins are crosslinkable with each other;
wherein the first and second coatings are substantially free of polyvinyl chloride, mobile and bound bisphenol A, mobile and bound aromatic glycidyl ether compounds, and mobile and bound oxirane-containing compounds; and
(d) optionally a gasket applied directly or indirectly onto at least a portion of the second coating in a manner effective to help the closure sealingly engage the container.

\* \* \* \* \*